(No Model.)
O. A. GILL.
MECHANISM FOR WEIGHING PACKAGE TEA, COFFEE, &c.
No. 399,192.   Patented Mar. 5, 1889.
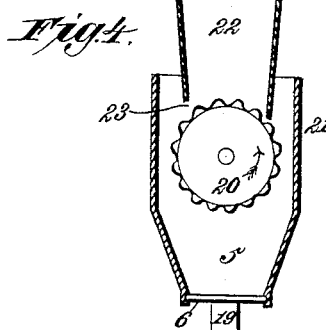
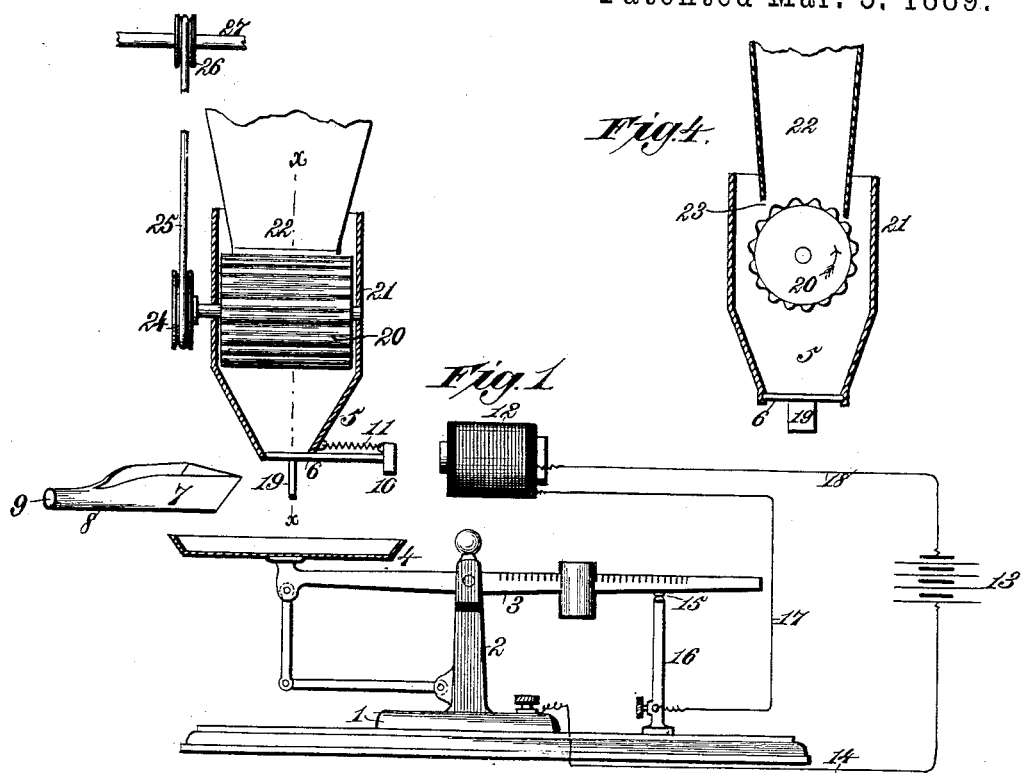
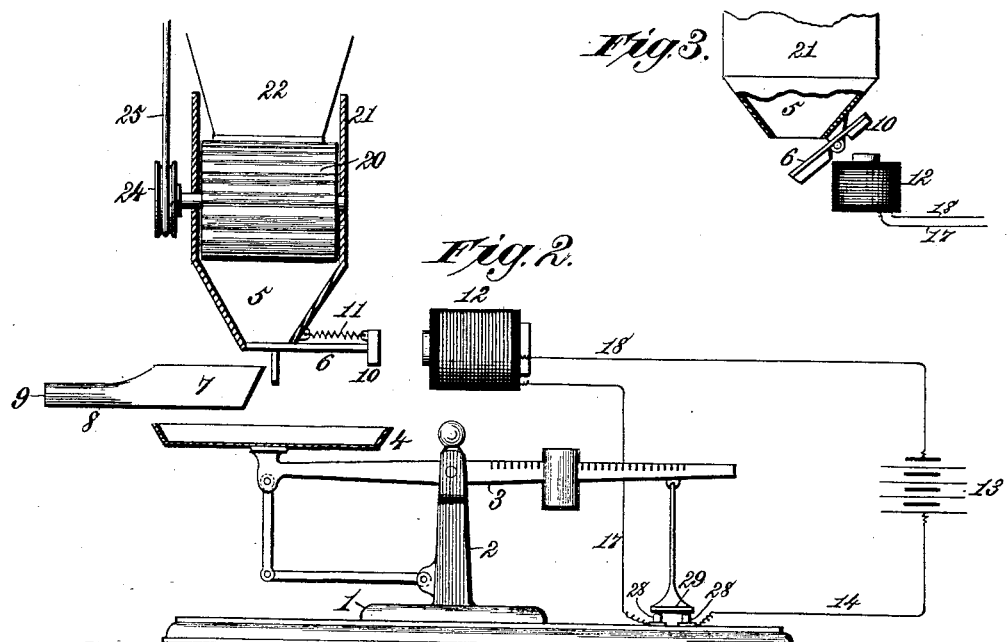
Witnesses.
Robt Everett
J. A. Rutherford
Inventor:
Owen A. Gill,
By James L. Norris,
Atty.

United States Patent Office.

OWEN A. GILL, OF BALTIMORE, MARYLAND.

MECHANISM FOR WEIGHING PACKAGE TEA, COFFEE, &c.

SPECIFICATION forming part of Letters Patent No. 399,192, dated March 5, 1889.

Application filed September 15, 1888. Serial No. 285,440. (No model.)

*To all whom it may concern:*

Be it known that I, OWEN A. GILL, a citizen of the United States, residing at Baltimore, in the State of Maryland, have invented new and useful Improvements in Mechanism for Weighing Package Teas, Coffees, Spices, and other Articles, of which the following is a specification.

In the weighing of proprietary articles—such as package teas, coffees, and other material by large manufacturers or dealers—it is the usual method for the attendants to supply the material to the scales, and after weighing the same to inclose it in a wrapper. By this method, where large numbers of packages are necessarily prepared with rapidity, it frequently occurs that the packages are under weight or over weight, owing to the haste of the person attending the scales, which irregularity in weight is very objectionable for obvious reasons.

The object of my invention is to avoid such objections and provide novel electrical mechanism for automatically closing the flow of the tea or other material to the weighing-scales immediately that the scale-beam tilts, which occurs the instant the proper quantity of material is supplied to the scale-pan.

The invention also has for its object to provide novel means whereby small packages of tea, coffee, and other material of uniform weight can be rapidly, continuously, and accurately prepared in great numbers without special care or watchfulness on the part of the attendant or the employment of skilled labor.

The invention also has for its object to provide novel means for producing a uniform and continuous force-feed of the teas, spices, and other similar articles which would not readily flow through the conduit or throatway to the scale-pan, which feed is so constructed and arranged in relation to a supply-tube and the valve that controls the supply of tea or other material to the scale-pan as to create an accumulating-chamber between the valve and force-feed, wherein the tea or other material slowly accumulates during such time as the valve is automatically closed by the tilting of the scale-beam.

The several objects of my invention I accomplish by the features of construction and mechanical contrivances organized for operation, as hereinafter described and claimed, reference being made to the accompanying drawings.

Figure 1 is a side elevation and a broken sectional view of sufficient to exhibit the practical working of the invention; Fig. 2, a similar view showing a modification of the electric circuit; Fig. 3, a detail view of the delivery-mouth of the throatway, showing a modification of the gate or valve to govern the flow of the material to the scale-pan; and Fig. 4, a detail sectional view taken on the line $x\ x$, Fig. 1.

In order to enable those skilled in the art to make and use my invention, I will now describe the same in detail, referring to the accompanying drawings, wherein—

The numeral 1 indicates the base, 2 the standard, 3 the scale-beam, and 4 the scale-pan, of a weighing-machine, all of which may be of any approved construction and pattern suitable for the conditions required to weigh small packages of tea, coffee, spices, and similar articles in quantities which usually vary in weight from one-eighth to a pound, although package teas, coffees, and similar goods may be prepared of greater or less weight.

A contracted throatway, 5, having a delivery-mouth governed by a gate or valve, 6, which valve slides, preferably, in guides formed in the contracted throatway 5, as clearly shown in Fig. 4, is located above and directly over the scale-pan to discharge the material to be weighed thereupon, there being a sufficient space between the delivery-mouth and the scale-pan for the insertion and removal of a small receiving-vessel, 7, which is placed upon the scale-pan to receive the material to be weighed, and is provided with a hollow or tubular handle, 8, open at its end 9 for the convenient introduction of the weighed material into or upon the package or wrapper.

The gate or valve shown in Figs. 1 and 2 is provided at one end with an armature, 10, and is adapted to slide horizontally across the delivery-mouth, and it is thrown to its closed position by a suitable spring, 11, or equivalent device. An electro-magnet, 12, of any suitable construction, is located in proper relation to the armature of the gate or valve, so that when the magnet is vitalized and the gate or valve is moved in one direction against the tension of the spring 11 such magnet will attract the armature, and thereby hold the gate or valve or control its position until the magnet is demagnetized.

In the construction shown in Figs. 1 and 2 the magnet controls the open position of the gate or valve—that is, holds it open—to permit the flow of tea or other material to the scale-pan, while the spring restores the gate or valve to its closed position to stop the flow of material the instant that the magnet is demagnetized.

The electro-magnet is in an electric circuit which is closed or broken by the movement on the scale-beam, whereby the gate or valve is closed the instant that the required weight of material is on the scale-pan.

In Fig. 1 one pole of a battery, 13, or other source of electricity connects by an electrical conductor, 14, with the metallic base or other metal part of the weighing-machine, and thence through the scale-beam to a contact-piece, 15, on the latter, which makes and breaks contact with a metallic post, 16, connected with one pole of the electro-magnet by a conductor, 17, the opposite pole of the magnet connecting by a conductor, 18, with the other pole of the battery or other source of electricity. The contact-piece on the scale-beam serves as a circuit-closer and makes and breaks the circuit, according to the position of the beam. As shown, the counterpoise has overbalanced the scale-pan, the circuit is closed, and the gate or valve is in its position to check the flow of tea or other material through the delivery-mouth. The attendant in the act of placing the receiving-vessel 7 on the scale-pan causes the former to strike a pendent arm, 19, on the gate or valve, thereby pushing the latter toward the vitalized electro-magnet, which attracts and holds the armature against the tension of the spring at the same time the vessel 7 is placed on the scale-pan and receives the descending stream of material. The provision of the projecting part or pendent part 19 on the valve in such position as to be above the scale-pan and in the path of the tea-receiver scoop or vessel 7 when passing the latter under the throatway 5 to the scale-pan is very important and useful in this type of apparatus, in that by the act of placing the tea-receiver 7 upon the scale-pan the valve is opened and adjusted to the position required to enable it to be controlled or held by the vitalized electro-magnet, while at the same time the tea-receiver 7 will be in proper position to immediately receive the tea or other material as the latter commences to flow from the delivery-mouth of the throatway. By this means the attendant is not required to manipulate levers or pay more strict attention than is required to pass the tea-receiver onto the scale-pan. When the required weight of material is in the receiving-vessel on the scale-pan and the scale-beam is overbalanced, the circuit is immediately broken by the contact-piece 15 on the scale-beam moving out of contact with the post 16, the magnet is demagnetized, and instantly the gate or valve is closed by the spring. The receiving-vessel containing the weighed material is then removed by the attendant and such material emptied into or upon the wrapper. When the receiving-vessel is removed from the scale-pan, the scale-beam tilts and the circuit-closer again closes the circuit, vitalizing the magnet, and the parts are in proper position for a repetition of the steps before set forth.

In automatic weighing-machines it is exceedingly difficult to weigh tea, spices, and similar articles, in that they will not steadily flow through a contracted throat or channel to the scales, and to remedy this and produce a uniform and continuous supply of such articles to the delivery mouth or orifice over the scale-pan I provide a rotating force-feed device, which comprises a mechanically-revolved cylinder, 20, having longitudinal grooves and ridges in its periphery and journaled in the expanded portion 21 of the throatway 5. A tube, 22, enters the open top of the expanded portion 21, and is so formed and adjusted that the periphery of the cylinder projects into the lower end of the tube in such manner as to provide a narrow transverse channel, 23, Fig. 4, between one side wall of the tube and the periphery of the cylinder, through which channel the tea or similar material is forced into the expanded portion 21 and down toward the delivery-mouth, which is governed by the gate or valve. The cylinder is driven by mechanism outside the throatway, so that the tea or other material is forced from the tube 22 toward the valve, and the latter is automatically closed, as explained, independent of the action or movement of the force-feed. The mechanical devices for driving the force-feed, as here exhibited, comprise a pulley or wheel, 24, on the shaft of the force-feed, connected by a belt, 25, or otherwise with a pulley or wheel, 26, on a shaft, 27, revolved continuously by a motor.

I do not deem it necessary to illustrate the motor, as it may be of any suitable construction—such, for example, as a small dynamo-electric machine. It is obvious, however, that the continuously-driven shaft may be otherwise geared to the cylinder. By this means I produce a uniform feed of such materials as would not readily flow to the scale-pan, and produce a practical automatic mechanism for rapidly weighing and putting up package teas, coffees, spices, and similar goods.

The slowly-rotating force-feeder is so located in the expanded portion 21 of the throatway 5 relatively to the lower open end of the supply-tube 22 as to provide an accumulating-chamber between the valve 6 and the force-feeder, in which the tea or other material accumulates during the time that the valve is automatically closed, and while a previouslyweighed quantity of tea or other material is being removed from the scale and discharged from the receiver 7 into its wrapper to form a package.

The relative arrangement of the supply-tube 22, expanded portion 21, channel 23, force-feed 20, throatway 5, valve 6, and scale-pan are very important and essential in dealing with tea, which is an article that will not properly flow of itself through a contracted throat, as before stated.

In Fig. 2 the construction, arrangement, and mode of operation are the same as heretofore described, except that the electric current is not through the scale-beam, but is through two separated conducting-posts, 28, and a circuit-closer, 29, suspended and insulated from the scale-beam. I do not confine myself to a horizontally-moving gate or valve, nor to an electro-magnet which controls the open position of the gate or valve. It is obvious that the gate or valve could otherwise open and close—for example, as shown in Fig. 3, where the valve is pivoted and swings open by gravity, while it is closed by the electro-magnet 12 when vitalized. In this arrangement the electro-circuit would of course be closed when the scale-beam is overbalanced by the material being weighed. This is, however, regarded by me as inferior to the construction in Figs. 1 and 2, which latter is substantially the mechanism I am now practically using. The tube 22 connects with the body of material which is to be weighed and prepared into package teas, coffees, spices, and other materials.

Having described my invention, what I claim is—

An apparatus for weighing and putting up package teas and other materials, consisting of a weighing-scale having a scale-pan, a throatway located above the scale-pan, a rotating force-feed, a supply-tube having its lower end arranged relatively to the force-feed to provide a narrow transverse channel at one side between a lower edge of the tube and the force-feed, a driven shaft, and devices, substantially as described, outside the throatway, which drive the force-feed to force the material laterally from the supply-tube through the channel and downward, and a valve for the throatway automatically closed when the scale-beam is overbalanced.

In testimony whereof I affix my signature in presence of two witnesses.

OWEN A. GILL.

Witnesses:
 JOHN O'G. ALLMAND,
 ADAM NEUS, Jr.